United States Patent [19]
Selby

[11] Patent Number: 5,543,120
[45] Date of Patent: Aug. 6, 1996

[54] METHOD FOR CONVERTING ASBESTOS TO NON-CARCINOGENIC COMPOUNDS

[75] Inventor: Thomas W. Selby, Kingston, Tenn.

[73] Assignee: The United States of America as represented by the United States Department of Energy, Washington, D.C.

[21] Appl. No.: 278,487

[22] Filed: Jul. 21, 1994

[51] Int. Cl.$^6$ .................................................. C01F 5/28
[52] U.S. Cl. .................... 423/167.1; 423/342; 423/489; 423/490
[58] Field of Search ...................... 423/167.1, 342, 423/489, 490

[56] References Cited

U.S. PATENT DOCUMENTS 5,258,131  11/1993  Mirick et al. ..................... 423/167.1

FOREIGN PATENT DOCUMENTS 372084  6/1990  European Pat. Off. ............ 423/167.1

Primary Examiner—Wayne Langel
Attorney, Agent, or Firm—David E. Breeden; Stephen D. Hamel; William R. Moser

[57] ABSTRACT

Hazardous and carcinogenic asbestos waste characterized by a crystalline fibrous structure is transformed into non-carcinogenic, relatively nonhazardous, and non-crystalline solid compounds and gaseous compounds which have commercial utilization. The asbestos waste is so transformed by the complete fluorination of the crystalline fibrous silicate mineral defining the asbestos.

18 Claims, 7 Drawing Sheets

METHOD FOR CONVERTING ASBESTOS TO NON-CARCINOGENIC COMPOUNDS

This invention was made with the support of the United States Government under contract No. DE-AC05-84OR21400 awarded by the U.S. Department of Energy. The U.S. Government has certain rights in this invention.

BACKGROUND OF THE INVENTION

The present invention relates generally to a method for converting carcinogenic asbestos waste material into non-carcinogenic and relatively non-hazardous compounds, and more particularly to the conversion of such asbestos material by fully fluorinating the crystalline fibrous silicate mineral defining the asbestos material for the transformation thereof into a silicon-free, non-crystalline solid compound and gaseous compounds.

Historically, asbestos, as defined by various impure silicate minerals characterized by crystalline fibrous structures, has been extensively utilized as thermal and electrical insulation and as a building material because of its insulating and fire-proof properties. Generally, two types of asbestos have been used in the United States for such purposes. The first and most common type of asbestos used is the so-called serpentine asbestos or chrysotile which is a magnesium silicate mineral possessing relatively long and flexible crystalline fibers which can be readily formed into mats and weavings and other desired configurations for use in building construction or in thermal and electrical insulation applications. The second type of asbestos used is amphibole asbestos formed of the silicate minerals, tremolite, actinolite, anthophyllite, and crocidolite. An amphibole asbestos is characterized by a hydroxyl, a silicon-to-oxygen ratio of 4 to 11, and a fibrous cleavage. The crystalline fibers of amphibole asbestos are substantially more brittle than the chrysotile asbestos fibers so as to somewhat limit the fabrication of amphibole asbestos into selected shapes.

Relatively recent investigations have demonstrated that asbestos is both a hazardous material capable of causing asbestosis, a pneumoconiosis produced by inhalation of fibrous asbestos particles, and a carcinogen capable of causing various forms of cancer. Because of these highly undesirable properties of asbestos, a considerable effort is currently being made to remove asbestos materials from buildings, especially schools and public buildings. This extensive asbestos removal program has resulted in a considerable amount of waste asbestos material which is presently disposed of by encasing the asbestos in suitable containment structures formed of a durable material such as plastic and then disposing the contained asbestos in an approved landfill. These present disposal methods of asbestos material are not only costly with respect to the manpower required for preparing the waste for disposal and for the possible eternal control over the landfill but also deny the use of large areas of land for any other purpose.

SUMMARY OF THE INVENTION

Accordingly, it is a principal aim or objective of the present invention to provide a method for effectively transforming or converting waste asbestos material from its hazardous and carcinogenic form to non-carcinogenic and relatively non-hazardous solid and gaseous compounds. This method for transforming asbestos comprises the step of contacting a mass of the asbestos with a volume of fluorine sufficient for effecting an exothermic reaction with the silicate mineral defining the asbestos and adequate for essentially fully fluorinating the silicate mineral to convert the silicate mineral to gaseous compounds including silicon fluoride and solid compounds defined by non-silicon-containing fluorides.

The asbestos transformed by the method of the present invention is chrysotile defined by a magnesium silicate mineral having the general chemical formula of $H_4Mg_3Si_2O_9$, or an amphibole defined by a silicate of magnesium, calcium, iron or sodium with a hydroxyl, a silica:oxygen ratio of 4:11, and a fibrous cleavage. Preferably, the chrysotile and amphibole asbestos is contacted with a volume of fluorine in excess of the amount required for fully fluorinating the mass of the asbestos to assure complete fluorination of the asbestos.

The fluorination and conversion of the chrysotile asbestos forms compounds including silicon fluoride, magnesium fluoride, hydrogen fluoride, and oxygen. The volume of fluorine that is adequate to essentially fully fluorinate and convert the magnesium silicate mineral of chrysotile to the aforementioned compounds is at least sufficient for the fluorination of the magnesium silicate mineral in accordance with the chemical equation: $H_4Mg_3Si_2O_9 + 9F_2 \rightarrow 2SiF_4\uparrow + 3MgF_2 + 4HF\uparrow + 4\frac{1}{2}O_2\uparrow$.

A further object of the present invention is to convert gaseous compounds produced from the fluorination of the asbestos into commercially useful compounds. Generally, this objective is achieved by the steps of separating the gaseous compounds from the solid fluoride compound such as $MgF_2$, and thereafter separating at least the $SiF_4$ from the separated gaseous compounds by passing a stream of the separated gaseous compounds through a water scrubber for converting the $SiF_4$ to HF and silicic acid. Alternatively, the stream of the gaseous compounds can be passed through a sodium hydroxide scrubber for converting the $SiF_4$ to sodium fluoride and sodium silicate.

The solid compounds resulting from the fluorination and conversion of asbestos materials such as described above include magnesium fluoride ($MgF_2$), calcium fluoride ($CaF_2$), ferric fluoride ($FeF_3$) and sodium fluoride (NaF) and mixtures thereof. These solid compounds have well known commercial applications such as hardeners for cement, ceramics, glass, as well being useful as in the production of insecticides and in various metallurgical procedures.

The utilization of fluorine in the method of the present invention requires over one pound of fluorine to be consumed for each pound of fully fluorinated asbestos. This extensive usage of fluorine is of a significant cost consideration with respect to the commercial acceptability of the present invention for reducing the significant inventory of asbestos waste. However, since the solid compounds and the gaseous compounds, with further processing, produced by the reaction have substantial commercial value, the overall cost of the present method is substantially reduced.

The method of the present invention can be practiced batch wise in a single reactor vessel or in a cascade of interconnected reactor vessels. In a batch-type reaction in a single reactor vessel a mass of asbestos comprising a silicate mineral in a crystalline fibrous form is confined in an enclosed volume of the reactor vessel. The enclosed volume is then evacuated to an absolute pressure adequate to remove substantially all oxygen-containing gases and loose or free water from the enclosed volume. A stream of fluorine gas is introduced into the evacuated volume in an amount at least sufficient to exothermically react with the silicate mineral and effect essentially the full fluorination of the silicate mineral for the conversion of the silicate mineral to relatively non-carcinogenic gaseous and solid compounds defined by $SiF_4$ and non-silicon-containing compounds. The gaseous compounds and excess fluorine, if any, are removed from the enclosed volume and thereafter the solid compounds or gaseous compounds are removed from the enclosed volume. With a cascade-type operation a plurality of enclosed volumes of a plurality of reactor vessels are serially connected together. Excess fluorine introduced into the first enclosed volume and gaseous compounds generated by the fluorination reaction in each enclosed volume are sequentially cascaded through the serially connected enclosed volumes.

Other and further objects of the present invention will become obvious upon an understanding of the illustrative method about to be described or will be indicated in the appended claims, and various advantages not referred to herein will occur to one skilled in the art upon employment of the invention in practice.

A preferred embodiment for the utilization for the method of the present invention has been chosen for the purpose of illustration and description. The preferred embodiment illustrated is not intended to be exhaustive nor to limit the invention to the precise reactor vessel arrangement or type of asbestos shown. The preferred embodiment is chosen and described in order to best explain the principles of the invention and their application and practical use to thereby enable others skilled in the art to best utilize the method of the present invention in various embodiments and modifications as are best adapted to the particular use contemplated.

DETAILED DESCRIPTION OF THE INVENTION

Figure 1:
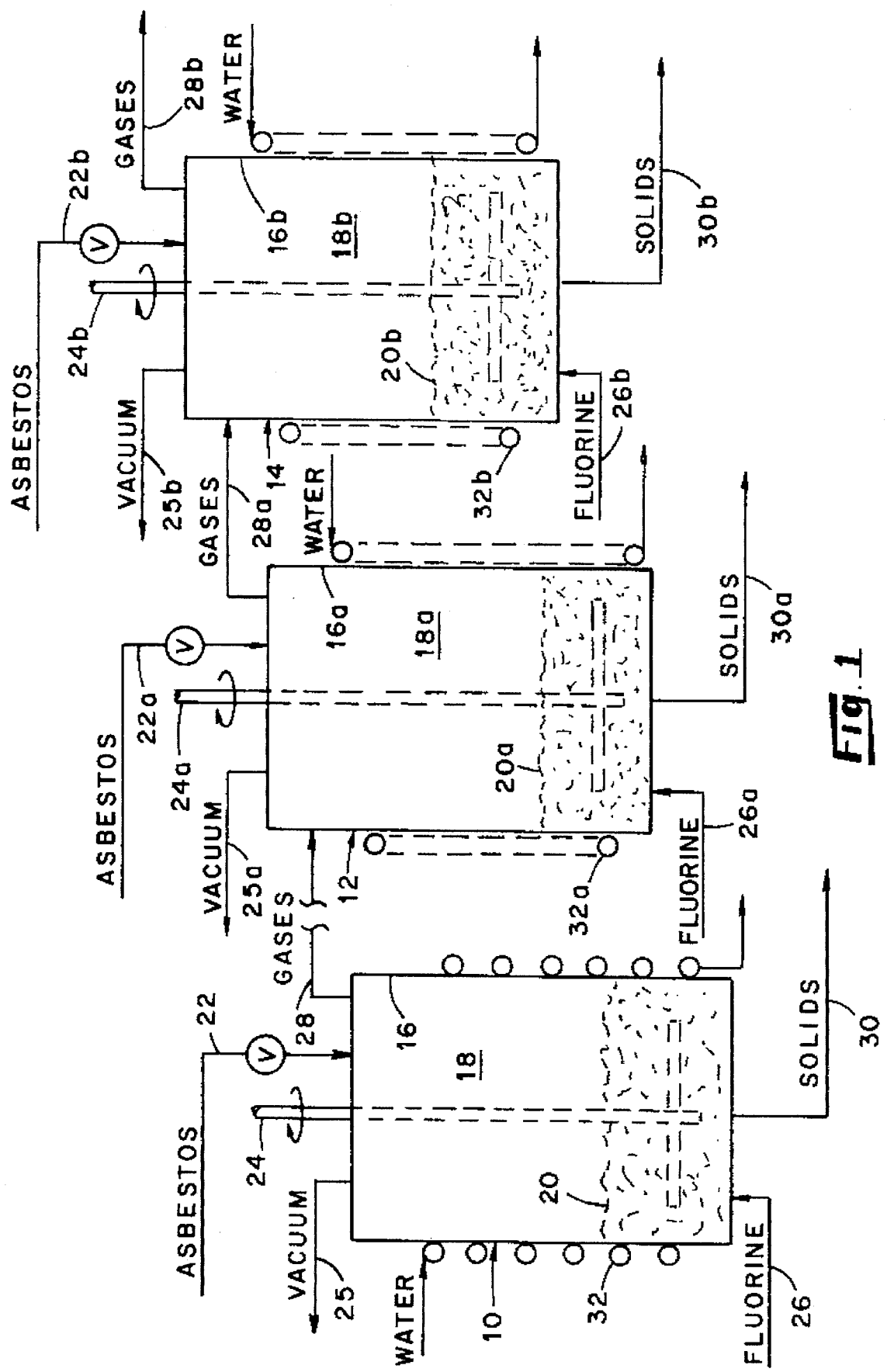
FIG. 1 is a schematic view illustrating a cascade of reactor vessels for the fluorination and conversion of asbestos material into non-carcinogenic and relatively nonhazardous solid and gaseous compounds in accordance with the method of the present invention.

The following description is directed to the full fluorination and conversion of asbestos material in a plurality of batch-type reactor vessels serially connected in the form of a cascade as illustrated in FIG. 1. However, it will appear clear that the asbestos conversion method of the present invention can be readily practiced in a single reactor vessel using a batch-type operation.

With reference to FIG. 1, three reactor vessels 10, 12, and 14 are shown serially coupled together in the form of a cascade. The reactor vessels 10, 12, and 14 may be similarly constructed with each vessel being formed of a high-temperature material that is resistant to corrosion by contact with fluorine such as provided by monel, nickel-plated stainless steel, copper, and the like. For the purpose of this description only the details of the reactor vessel 10 is described below but with the same numbers used in this description followed by the letter (a) or (b) being respectively applicable to similar components or structures used in or with the reactor vessels 12 and 14.

Reactor vessel 10 is shown comprising a shell or housing 16 containing an enclosable cavity or volume defining a reaction chamber 18. A charge of waste asbestos as generally shown at 20 is initially introduced into the reaction chamber through a suitable inlet such as a valved inlet 22 connected to the top of the reactor vessel 16. Alternatively, the charge of waste asbestos material 20 could be introduced into the reaction chamber 18 in any suitable manner such as through doors or a removable top (not shown). A stirring mechanism as generally shown 24 may be contained in each reaction vessel for stirring the charge of asbestos 20 and thereby promoting contact between the asbestos and the fluorine.

Prior to the introduction of the charge of waste asbestos 20 into the reaction chamber 18 of the reactor 10, the waste asbestos is preferably sized to a dimension which will assure contact between fluorine and asbestos fibers confined within or supported by each piece of asbestos material introduced into the reaction chamber 18. This sizing of the waste asbestos material can be easily achieved by grinding or otherwise breaking up of the asbestos waste material into relatively small chunks or pieces. This sizing of the waste asbestos is of particular importance to the method of the present invention when the asbestos material is contained in a bonding matrix such as provided by cementitious material. Normally, the sizing of the asbestos material should be sufficient to provide pieces of asbestos with a cross section in the range of about 0.5 inch to about 12.0 inches. Of course, if the asbestos waste is substantially asbestos with no or little additional bonding agents or additives, larger pieces of asbestos waste may be utilized in the asbestos-transformation method of the present invention.

With a charge of waste asbestos 20 contained in the reaction chamber 18, the latter is heated in any suitable manner to a temperature adequate to evaporate any water present in the reaction chamber including surface water on the asbestos. A temperature of about 250° F. is sufficient for this purpose. After heating the reaction chamber 18, it is evacuated via vacuum line 25 coupled to a suitable vacuum source (not shown) for removing the air and water vapor from the reaction vessel 18. By heating and then evacuating the heated reaction chamber 18 to a sub-atmospheric pressure corresponding to about 1 to 2 pounds absolute, essentially all the air and residual water can be removed from the reaction chamber 18. This evacuation of the reaction chamber 18 also facilitates the introduction of a sufficient amount of fluorine into the reaction chamber 18 to effect the full fluorination of the waste asbestos charge 20 without increasing the pressure of the reaction chamber 18 to a pressure exceeding approximately atmospheric. However, if deemed necessary such as in the case of a cascade operation, successively operated reaction chamber of the serially connected reaction vessels can be evacuated to slightly lower pressure than each previous reaction chamber to assure the sequential flow of gases between the cascaded reaction chambers as well as maintaining the operational pressure at substantially ambient pressure in each reaction chamber throughout the cascade.

A stream of fluorine is introduced into the evacuated reaction chamber 18 through inlet line 26 shown coupled to the base of the reactor vessel housing 16. An exothermic fluorinating reaction between the fluorine and the silicate mineral defining the asbestos is initiated when the fluorine contacts the charge of asbestos material 20. Sufficient fluorine is introduced into the reaction chamber 18 to fully fluorinate the silicate mineral defining the asbestos and convert or transform the silicate mineral compound in solid and gaseous compounds defined by a solid fluoride compound that is characterized by being essentially free of silica and any crystalline fiber structure which is believed to be the main source of the hazardous and carcinogenic properties of the asbestos and by gaseous compounds primarily defined by silicon fluoride, hydrogen fluoride, and oxygen.

Approximately 1.25 lbs of fluorine is required to fully fluorinate 1.0 lb of chrysotile asbestos or amphibole asbestos. Preferably, the amount of fluorine introduced into the reaction chamber 18 is in a slight excess of the amount required for fully fluorinating the silicate mineral to assure that sufficient fluorine is present to effect the full fluorination of the silicate mineral. Normally, an excess amount of fluorine corresponding to about 0.05 lb to about 0.2 lb above 1.25 lbs per each pound of asbestos provides a sufficient excess of fluorine to assure the full fluorination of the asbestos.

By employing a cascade-type arrangement of reaction vessels as illustrated in FIG. 1, the reaction gases and any excess fluorine remaining from the exothermic fluorination reaction of charge asbestos 20 in reaction vessel 10 are conveyed into reaction vessel 12 via line 28 and then into reaction vessel 14 via line 28a together with any excess fluorine and the cumulative reaction gases from reaction vessels 10 and 12. Fluorine in an amount corresponding to 1.25 lbs for each pound of asbestos 20 in the reaction vessel 10 plus an excess of 0.2 lb of fluorine for each pound of fluorine required for full fluorination is introduced into the reaction chamber 18 through line 26. Fluorine in an amount essentially corresponding to the 1.25 lbs required for the conversion of each pound of asbestos is introduced into reactor vessel 12 to combine with the excess fluorine received from the reactor vessel 10 and effect the exothermic reaction for fully fluorinating the asbestos charge 20a. This sequence is repeated throughout the cascade for fully fluorinating the asbestos charges in each reactor vessel 1 0, 12, and 14 and any additional reactor vessels which may be employed in the cascade arrangement. By using a cascade of reactor vessels, the introduction of the excess fluorine is normally required only in the first reaction vessel 10 to assure that sufficient fluorine is available for the full fluorination of the asbestos charges in each of the sequentially operated reaction vessels, thus obviating the added expense of introducing excess fluorine into each reactor vessel of the cascade, Solid compounds produced by the fluorination of the asbestos may be discharged from the reaction vessels 10, 12 and 14 in any suitable manner such as by employing a discharge line at the base of each reaction vessel as generally shown at 30.

The exothermic fluorination reaction between the fluorine and the silicate mineral of the asbestos during the complete fluorination the latter is relatively violent with significant and rapid increases in reaction temperature occurring as the exothermic fluorination reaction progresses. Thus, in order to assure that the reaction temperatures do not escalate to a level where undesirable reaction conditions occur such as the over heating or the over pressurizing of the reactor, and in order to control the exothermic reaction and thus the rate of asbestos fluorination, the maximum temperature of the exothermic reaction is maintained by suitable controls in a temperature range of about 400° to 600° F., preferably about 500° F. By controlling the temperature of the exothermic reaction and the rate of fluorine flowing into the reaction chamber 18, the rate of fluorination can be readily regulated to assure complete fluorination of the asbestos charge in a relatively safe manner. The control over the reaction temperature can be provided by cooling the reaction vessel and its contents with a suitable cooling arrangement such as provided by a cooling jacket or coils such as shown at 32 in FIG. 1 disposed about the reaction vessel. The controlled circulation of water or another suitable coolant such as oil through these coils 32 is utilized to maintain the maximum reaction temperature within the aforementioned temperature range.

The method of the present invention successfully transforms any of various types of asbestos such as described above from a hazardous and carcinogenic material into non-carcinogenic and relatively non-hazardous solid compounds that can be used commercially or disposed of in landfills without special precautions or extensive or permanent control. As mentioned above, these solid compounds depend upon the type of the asbestos being fluorinated and include $MgF_2$, $CaF_2$, $FeF_3$, and $NaF$ and mixtures thereof. These compounds have well known commercial applications. For example, as mentioned above, the $MgF_2$ produced from the fluorination of chrysotile is commonly used as a hardener for cement, ceramic, and glass and when grown into crystals, can be utilized for polarizing prisms, lenses, and windows.

The gaseous compounds resulting from the fluorination reaction of any of the aforementioned forms of asbestos predominantly consist of silicon fluoride, hydrogen fluoride, and oxygen. The silicon fluoride and hydrogen fluoride are readily converted into commercially useful compounds such as hydrofluoric acid and silicic acid by passing the gaseous compounds resulting from the fluorination through a water scrubber which converts the silicon fluoride to hydrogen fluoride and silicic acid (silica gel). The hydrogen fluoride reacts with water to form hydrofluoric acid that is useful for glass etching, frosting, metal manufacturing and the like. The silicic acid can be used as an insecticide carrier, desiccant, or absorbent. Alternatively, the gaseous compounds can be converted to sodium fluoride and sodium silicate by passing the exhaust gas stream from the reactors through a sodium hydroxide scrubber. Sodium fluoride is commonly used as a chemical intermediate in electroplating, as a fluorination agent, and in the manufacture of pesticides and disinfectants while sodium silicate (water glass) is commonly used in soaps, treating wood against decay, and as a fire retardant.

If desired, hydrogen fluoride in the stream of gaseous compounds resulting from the fluorination reaction can be removed before scrubbing the silicon fluoride by employing cold traps. The purity of the so removed hydrogen fluoride depends upon the contaminants associated with the asbestos which would be produced in gaseous forms during the fluorination process. These contaminants may or may not be readily separated from the so removed hydrogen fluoride. However, if the hydrogen fluoride is not removed prior to the scrubbing of the silicon fluoride, it can be utilized in the water scrubber or the sodium hydroxide scrubber in the formation of the aforementioned compounds.

Inasmuch as chrysotile is the form of asbestos most commonly used in the U.S. and in order to provide a more facile understanding of the method of the present invention, an example of transforming a batch of chrysotile asbestos from a hazardous and carcinogenic material into useful non-carcinogenic and relatively non-hazardous solid and gaseous compounds is set forth below.

EXAMPLE

Figure 2:
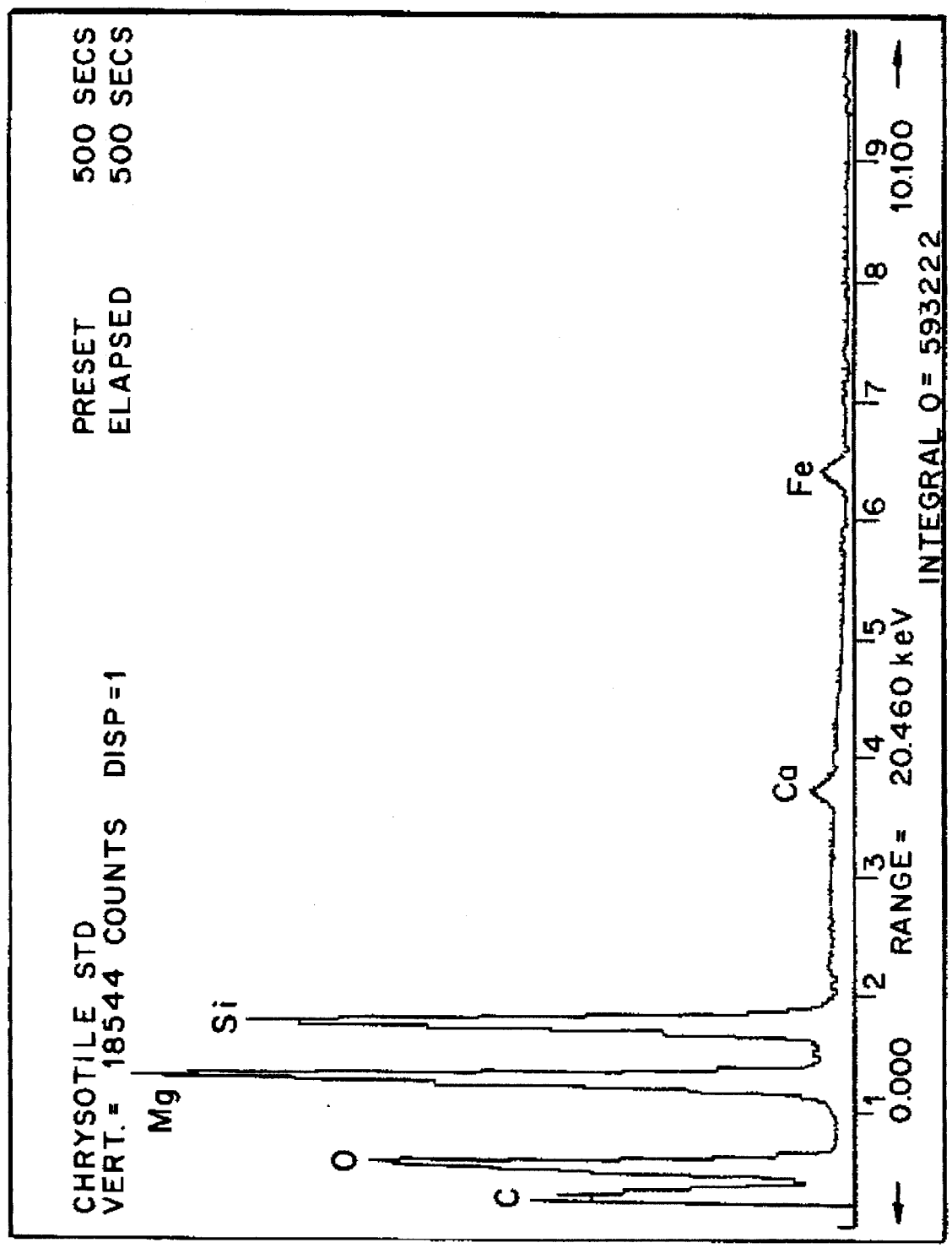
FIG. 2 is a graph of a standard sample of chrysotile asbestos provided by transmission electron microscopy (TEM) and illustrating the concentration of the major elements in the asbestos.
Figure 3:
FIG. 3 is a scanning electron photomicrograph (SEM) of chrysotile asbestos illustrating the crystalline fibrous structure thereof.

An analysis of a standard sample of chrysotile asbestos using transmission electron microscopy (TEM) is shown in FIG. 2 where the major peaks show significant concentrations of carbon, oxygen, magnesium, and silicon. A scanning electron photomicrograph (SEM) of the standard sample of chrysotile asbestos is illustrated in FIG. 3 and shows the crystalline fiber structure of chrysotile asbestos. A 1 lb charge of chrysotile asbestos having the generally formula $H_4Mg_3Si_2O_9$ was loaded into a batch-type monel reactor vessel. The asbestos-loaded reactor vessel was then heated to 250° F. to evaporate any water in the reactor vessel. The heated reactor vessel was sealed and evacuated to a pressure corresponding to 1 lb absolute pressure for removing air and free water from within the reaction vessel. A charge of fluorine having a total weight of 1.25 lbs was introduced into the reaction vessel where the fluorine exothermically reacted with the asbestos to fully fluorinate the silicate mineral defining the asbestos in accordance with the formula: $H_4Mg_3Si_2O_9+9F_2\rightarrow 2SiF_4\uparrow+3MgF_2+4HF\uparrow+4½O_2\uparrow$. During this fluorination reaction, the temperature of the exothermic reaction was controlled at a maximum temperature of 500° F. by water cooling the reaction vessel. The full fluorination of the asbestos consumed the 1.25 lb fluorine charge. The full fluorination of the asbestos resulted in the production of the compounds $MgF_2$, $SiF_4$, HF, and $O_2$. In accordance with this general chemical equation for the exothermic reaction, each pound of fully fluorinated asbestos would require essentially 1.25 lbs of fluorine with this fluorination reaction, in turn, producing about 0.29 lbs of hydrogen fluoride, about 0.75 lbs of silicon fluoride, about 0.67 lbs of magnesium fluoride, and about 0.52 lbs of oxygen. Converting the silicon fluoride by using water scrubbers would produce about 0.5 lbs of silica gel and 0.5 lbs of aqueous hydrogen fluoride which can be converted to hydrofluoric acid. Alternatively, if a sodium hydroxide scrubber is utilized about 0.88 lbs of sodium silicate and 1.2 lbs of sodium fluoride can be produced.

Figure 4:
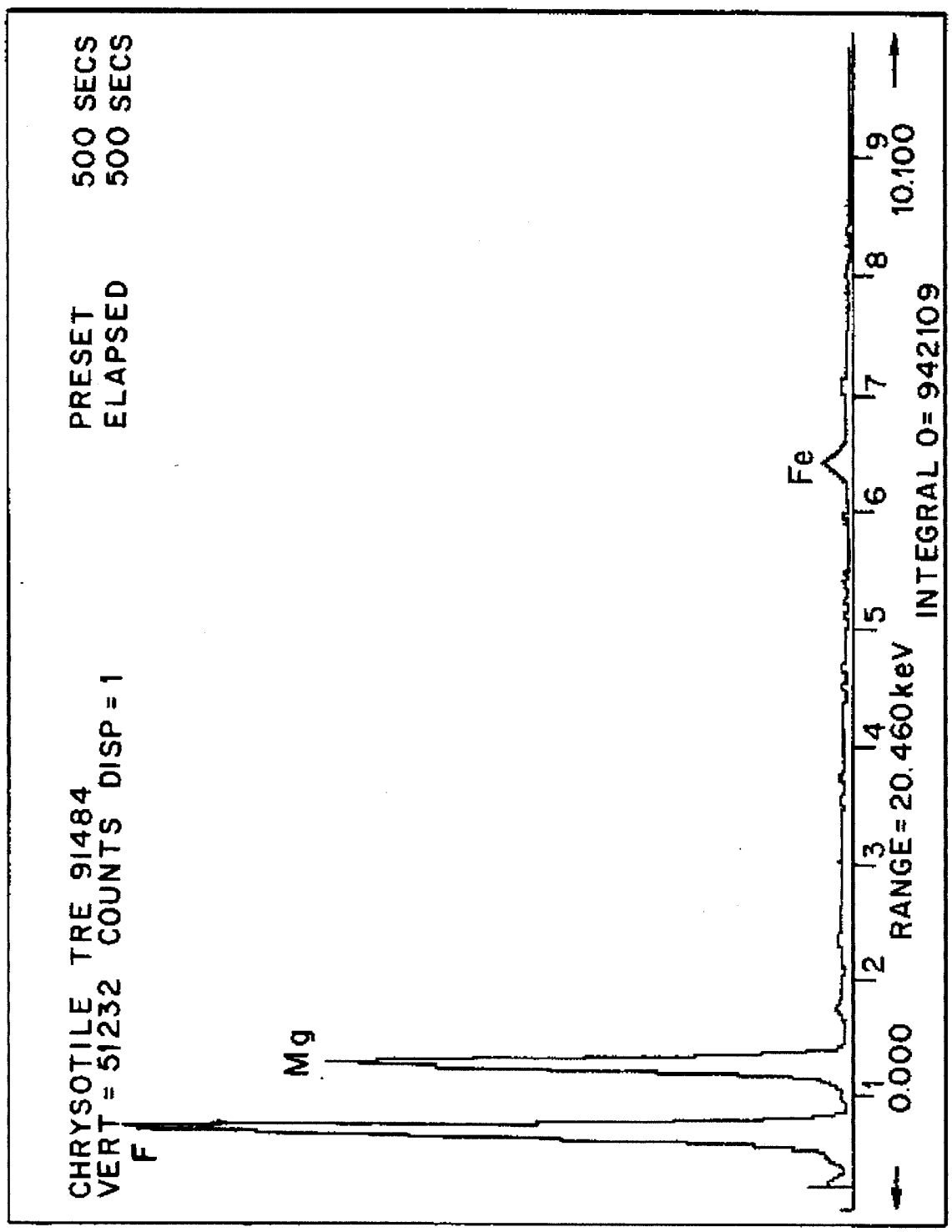
FIGS. 4 and 6 are graphs provided as in FIG. 2 and respectively illustrating the concentration of major elements in a powder sample and a separated fiber sample taken from the solid compound resulting from the fluorination of chrysotile asbestos.
Figure 5:
FIGS. 5 and 7 are SEM's respectively illustrating the absence of crystalline structure in the powder sample of FIG. 4 and the fiber sample of FIG. 6.
Figure 6:
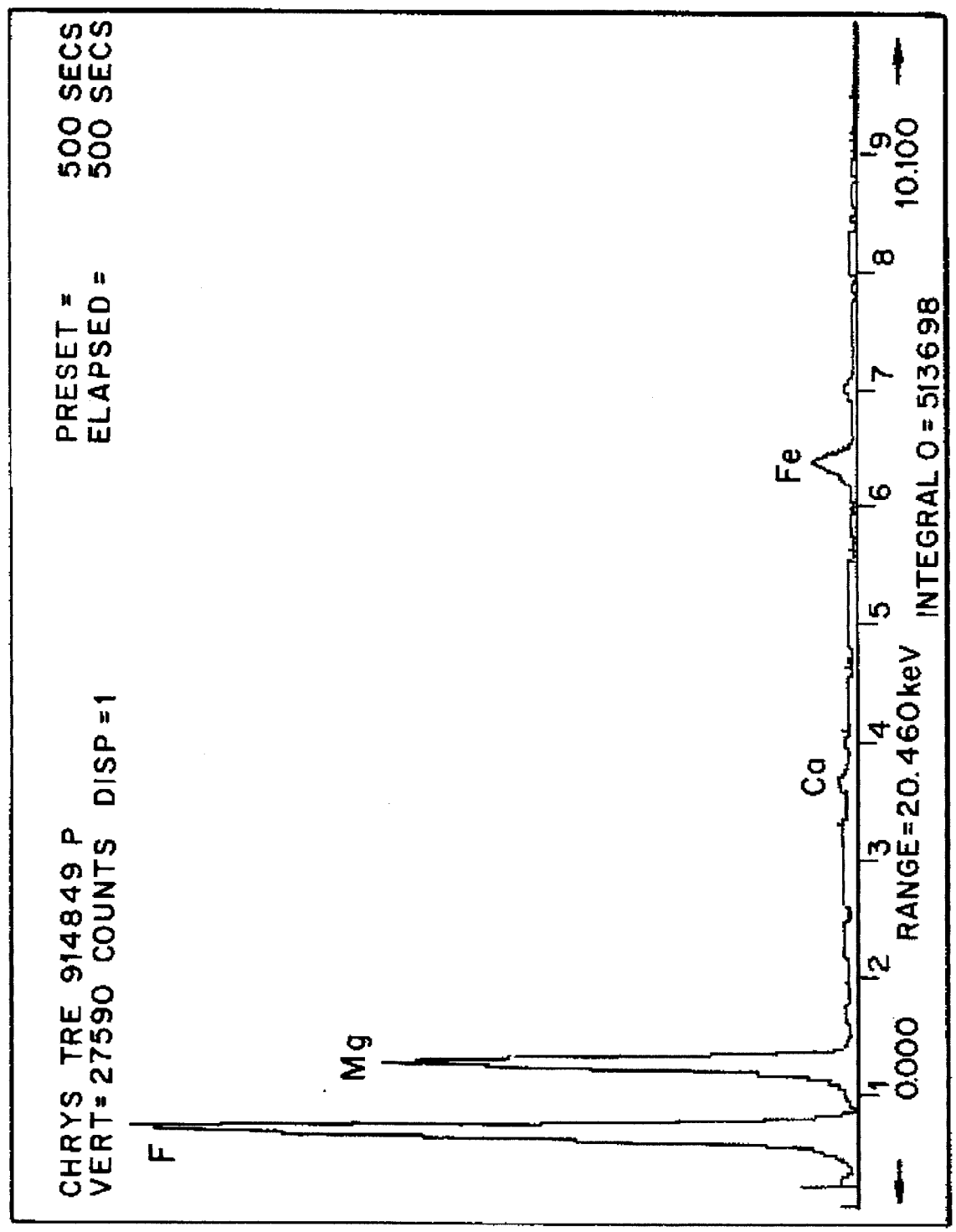
Figure 7:

A representative 5 mg sample of the brownish powder resulting from this fluorination of the chrysotile asbestos was dispersed in methanol. A drop of the suspended powder was then evaporated onto a 200 mesh copper grid coated with carbon film, the grid was then placed in the transmission electron microscope and examined for asbestos using x-rays. FIG. 4 shows a TEM analysis of the resulting magnesium fluoride powder produced by the fluorination of the chrysotile asbestos shows that only fluorine and magnesium remain in appreciable quantities. The absence of silicon in this graph is indicative of the absence of silica and thus the crystalline fibrous structure of asbestos. An SEM analysis of this powder sample is shown in FIG. 5 further illustrates that the characteristic crystalline fibers of chrysotile are not present. While a relatively large number of small fibrous structures remain after the completion of the fluorination reaction, a TEM analysis of these fibrous structures showed them to be composed largely of magnesium and a trace of iron but no silicon as indicated by the graph in FIG. 6. In FIG. 7 an SEM analysis of these fibrous structures shows that the fibrous structure has a granular non-crystalline surface morphology. Also, the fibrous structure did not give a spot pattern of crystalline materials when examined by selected area electron diffraction techniques. Thus, the tests on the solid compounds remaining after the complete fluorination of the asbestos indicated that no crystalline fibers were present in these samples so as to demonstrate that the solid compounds lack of the carcinogenic properties attributed to crystalline fibrous structures of asbestos.

It will be seen that the present invention provides a mechanism by which the vast inventories of asbestos waste can be converted into non-carcinogenic and relatively non-hazardous compounds so as to significantly reduce the problems associated with the containment and storage of the waste asbestos. Also, all of the compounds produced by the fluorination method of the present invention have commercial value so as to considerably mitigate the cost of transforming the asbestos waste into non-carcinogenic and relatively non-hazardous compounds.

What is claimed is:

1. A method for transforming asbestos comprising a silicate mineral in a crystalline fibrous form from a carcinogenic and hazardous material to non-carcinogenic, relatively nonhazardous, and non-crystalline compounds, comprising the step of contacting a mass of fibrous asbestos comprising a silicate mineral with a reactant consisting of a sufficient volume of fluorine gas for effecting an exothermic reaction with the silicate mineral in said asbestos that is adequate for fluorinating silicate mineral in said asbestos for converting the silicate mineral to a gaseous silicon-containing compound consisting of $SiF_4$ and to non-silicon-containing gaseous and solid compounds.

2. A method for transforming asbestos comprising a silicate mineral in a crystalline fibrous form from a carcinogenic and hazardous material to non-carcinogenic, relatively nonhazardous, and non-crystalline compounds as claimed in claim 1, wherein the asbestos is chrysotile defined by a magnesium silicate mineral having the general chemical formula of $H_4Mg_3Si_2O_9$, or an amphibole defined by a silicate of magnesium, calcium, iron or sodium with a hydroxyl, a silica:oxygen ratio of 4:11, and a fibrous cleavage.

3. A method for transforming asbestos comprising a silicate mineral in a crystalline fibrous form from a carcinogenic and hazardous material to non-carcinogenic, relatively nonhazardous, and non-crystalline compounds as claimed in claim 2, wherein the mass of fibrous asbestos is contacted with a volume of fluorine gas in excess of the amount required for fully fluorinating the silicate mineral.

4. A method for transforming asbestos comprising a silicate mineral in a crystalline fibrous form from a carcinogenic and hazardous material to non-carcinogenic, relatively nonhazardous, and non-crystalline compounds as claimed in claim 2, wherein the asbestos is the chrysotile, and wherein the fluorination and conversion of the magnesium silicate mineral forms said compounds which comprise $SiF_4$, $MgF_2$, HF, and said $O_2$, and wherein the volume of fluorine adequate to essentially fully fluorinate and convert the magnesium silicate mineral to said compounds is at least sufficient for the fluorination of the magnesium silicate mineral in accordance with the chemical equation: $H_4Mg_3Si_2O_9+9F_2\rightarrow 2SiF_4\uparrow+3MgF_2+4HF\uparrow+4½O_2\uparrow$.

5. A method for transforming asbestos comprising a silicate mineral in a crystalline fibrous form from a carcinogenic and hazardous material to non-carcinogenic, relatively nonhazardous, and non-crystalline compounds as claimed in claim 4, wherein the mass of fibrous asbestos is contacted with a volume of fluorine in excess of the amount required for fully fluorinating the magnesium silicate mineral in accordance with said chemical equation.

6. A method for transforming asbestos comprising a silicate mineral in a crystalline fibrous form from a carcinogenic and hazardous material to non-carcinogenic, relatively nonhazardous, and non-crystalline compounds as claimed in claim 5, wherein the volume of fluorine including the excess of the amount required for fully fluorinating the mass of the magnesium silicate mineral corresponds to a ratio, by weight, of about 1.25 to about 1.45 parts fluorine to 1.0 part of the magnesium silicate mineral.

7. A method for transforming asbestos comprising a silicate mineral in a crystalline fibrous form from a carcinogenic and hazardous material to non-carcinogenic, relatively nonhazardous, and non-crystalline compounds as claimed in claim 2, including the steps of separating a stream of the gaseous compounds partially defined by silicon fluoride from any solid compounds, and thereafter separating at least the silicon fluoride from the stream of the separated gaseous compounds by passing the stream of the gaseous compounds through a water scrubber for converting the silicon fluoride to hydrogen fluoride and silicic acid.

8. A method for transforming asbestos comprising a silicate mineral in a crystalline fibrous form from a carcinogenic and hazardous material to non-carcinogenic, relatively nonhazardous, and non-crystalline compounds as claimed in claim 2, including the steps of separating a stream of the gaseous compounds partially defined by silicon fluoride from any solid compounds, and thereafter separating at least the silicon fluoride from the stream of the separated gaseous compounds by passing the stream of the gaseous compounds through a sodium hydroxide scrubber for converting the silicon fluoride to sodium fluoride and sodium silicate.

9. A method for transforming asbestos comprising a silicate mineral in a crystalline fibrous form from a carcinogenic and hazardous material to non-carcinogenic and relatively nonhazardous compounds, said method consisting essentially of the steps of confining a mass of asbestos comprising a silicate mineral in an enclosed volume, evacuating the enclosed volume to an absolute pressure adequate to remove substantially all oxygen-containing gases and free water from the enclosed volume, introducing a stream of fluorine gas into the evacuated volume in an amount at least sufficient to exothermically react with the silicate mineral in said asbestos and effect essentially full fluorination of the silicate mineral for the conversion of the silicate mineral to the non-carcinogenic and relatively nonhazardous gaseous and solid compounds defined by a silicon-containing gaseous compound consisting of $SiF_4$ and non-silicon-containing gaseous and solid compounds, removing the gaseous compounds from the enclosed volume, and thereafter removing the solid compounds from the enclosed volume.

10. A method for transforming asbestos comprising a silicate mineral in a crystalline fibrous form from a carcinogenic and hazardous material to non-carcinogenic and relatively nonhazardous compounds as claimed in claim 9, wherein mass of asbestos confined in the enclosed volume is chrysotile defined by a magnesium silicate mineral having the general chemical formula of $H_4Mg_3Si_2O_9$, or an amphibole defined by a silicate of magnesium, calcium, iron or sodium with a hydroxyl, a silica: oxygen ratio of 4:11, and a fibrous cleavage.

11. A method for transforming asbestos comprising a silicate mineral in a crystalline fibrous form from a carcinogenic and hazardous material to non-carcinogenic and relatively nonhazardous compounds as claimed in claim 10, wherein the asbestos is the chrysotile, and wherein the fluorination and conversion of the magnesium silicate mineral forms the compounds including said $SiF_4$ and $MgF_2$, HF, and $O_2$, and wherein the volume of fluorine adequate to essentially fully fluorinate and convert the magnesium silicate mineral to said compounds is at least sufficient for the fluorination of the magnesium silicate mineral in accordance with the chemical equation: $H_4Mg_3Si_2O_9+9F_2 \rightarrow 2SiF_4\uparrow + 3MgF_2+4HF\uparrow+4\frac{1}{2}O_2\uparrow$.

12. A method for transforming asbestos comprising a silicate mineral in a crystalline fibrous form from a carcinogenic and hazardous material to non-carcinogenic and relatively nonhazardous compounds as claimed in claim 9, wherein the amount of fluorine in said stream thereof introduced into the enclosed volume corresponds to a ratio, by weight, of at least about 1.25 parts of fluorine to 1.0 part of the silicate mineral.

13. A method for transforming asbestos comprising a silicate mineral in a crystalline fibrous form from a carcinogenic and hazardous material to non-carcinogenic and relatively nonhazardous compounds as claimed in claim 9, wherein the amount of fluorine in the stream thereof introduced into the enclosed volume is in excess of the amount required for fully fluorinating the mass of the silicate mineral.

14. A method for transforming asbestos comprising a silicate mineral in a crystalline fibrous form from a carcinogenic and hazardous material to non-carcinogenic and relatively nonhazardous compounds as claimed in claim 9, wherein the excess amount of fluorine in said stream thereof introduced into the enclosed volume corresponds to a ratio, by weight, of about 1.25 to about 1.45 parts of fluorine to 1.0 part of the silicate mineral.

15. A method for transforming asbestos comprising a silicate mineral in a crystalline fibrous form from a carcinogenic and hazardous material to non-carcinogenic and relatively nonhazardous compounds as claimed in claim 9, including the additional step of sizing the mass of the silicate mineral into pieces in a size range of about 0.5 inch to about 12.0 inches in cross section before the introduction of the mass of asbestos into the enclosed volume.

16. A method for transforming asbestos comprising a silicate mineral in a crystalline fibrous form from a carcinogenic and hazardous material to non-carcinogenic and relatively nonhazardous compounds as claimed in claim 9, including the additional step of maintaining the enclosed volume at a maximum temperature in the range of about 400° to 600° F. during the exothermic reaction.

17. A method for transforming asbestos comprising a silicate mineral in a crystalline fibrous form from a carcinogenic and hazardous material to non-carcinogenic and relatively nonhazardous compounds as claimed in claim 13, including the steps of connecting the enclosed volume to at least one additional enclosed volume, confining a mass of asbestos in said at least one additional enclosed volume, introducing said excess amount of fluorine into at least the first mentioned enclosed volume, conveying from the first mentioned enclosed volume into said at least one additional enclosed volume the gaseous compounds produced by the essentially full fluorination of the silicate mineral in the first mentioned enclosed volume, conveying into said at least one additional enclosed volume excess fluorine remaining in the first mentioned enclosed volume from the essentially full fluorination of the silicate material, and introducing a stream of fluorine into said at least one additional enclosed volume in an amount at least sufficient to combine with the excess fluorine from the first mentioned enclosed volume and essentially fully fluorinate the silicate mineral in said at least one additional enclosed volume.

18. A method for transforming asbestos comprising a silicate mineral in a crystalline fibrous form from a carcinogenic and hazardous material to non-carcinogenic and relatively nonhazardous compounds as claimed in claim 17, wherein a plurality of enclosed volumes are serially connected together, and wherein excess fluorine and said gaseous compounds are cascaded through the serially connected enclosed volumes.

* * * * *